Figure 7:
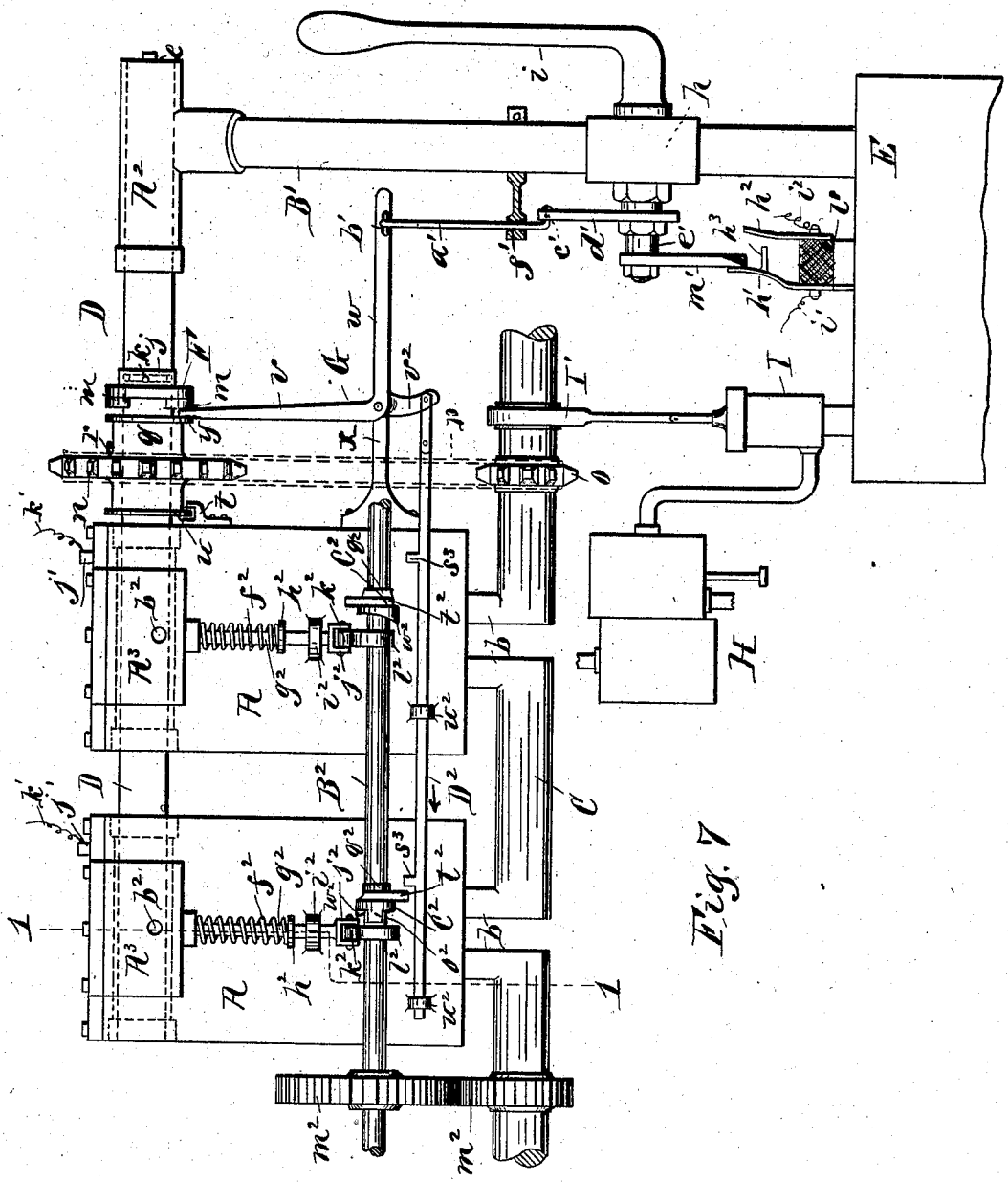

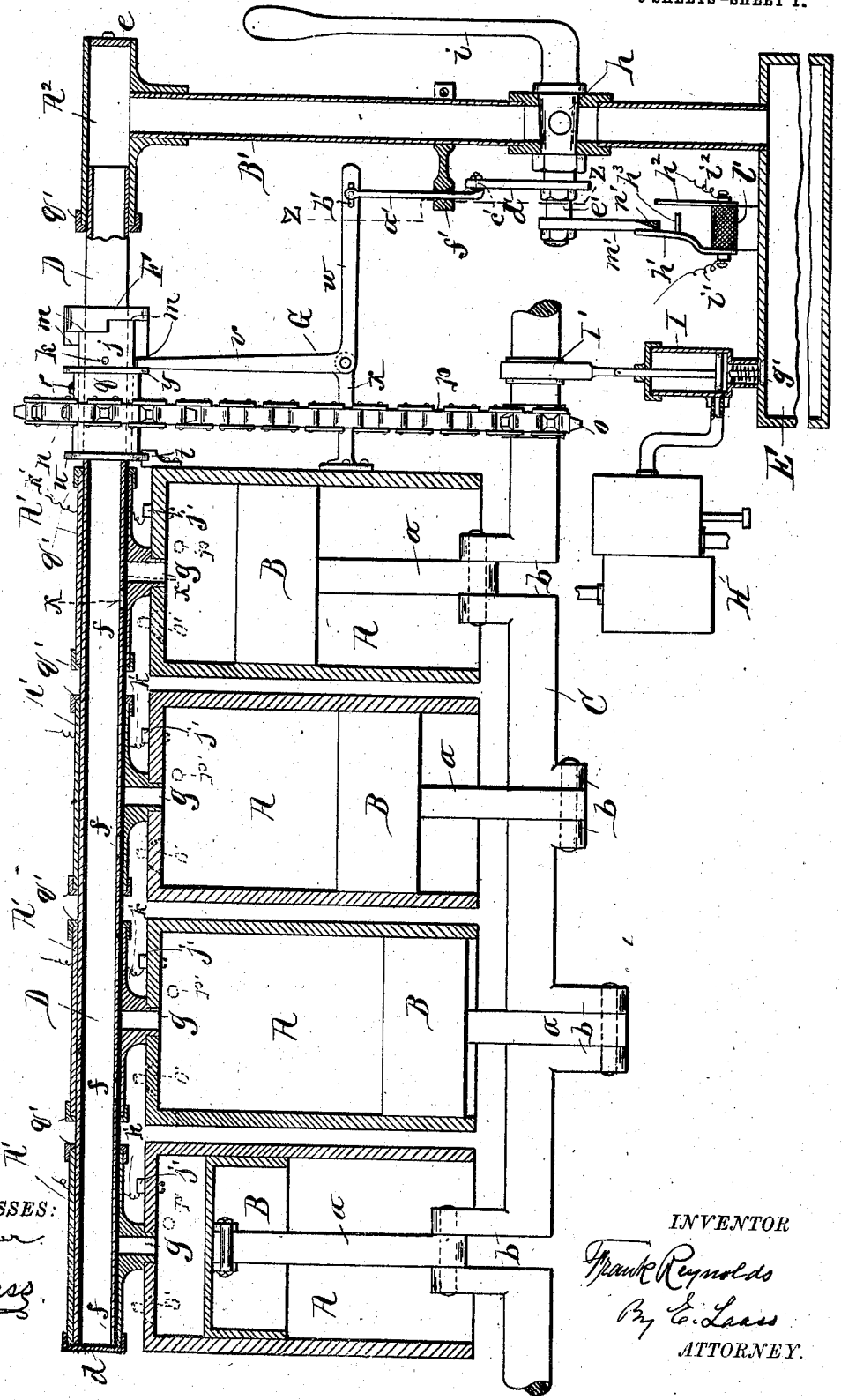

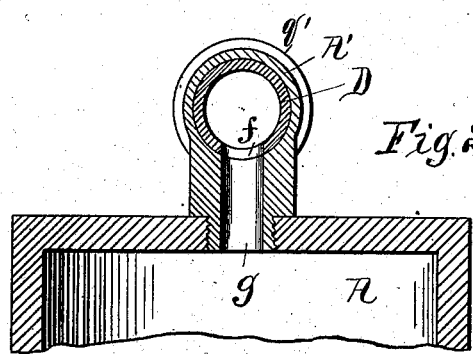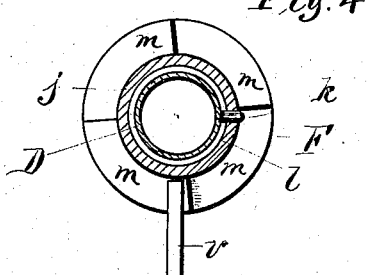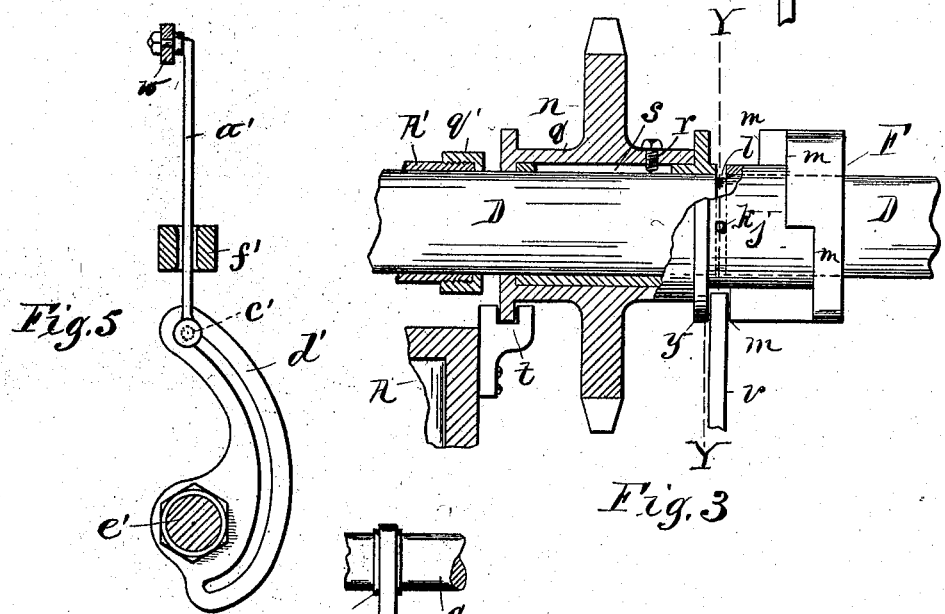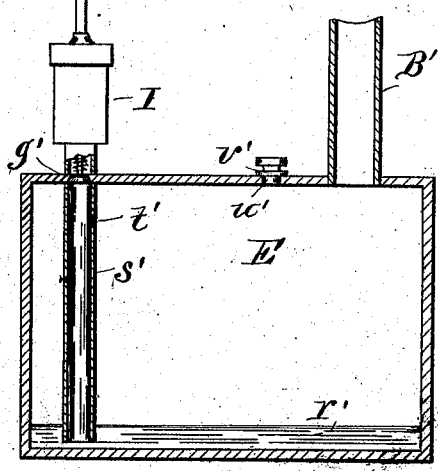

F. REYNOLDS.
STARTING DEVICE FOR GASOLENE ENGINES.
APPLICATION FILED FEB. 17, 1904.
899,618.
Patented Sept. 29, 1908.
5 SHEETS—SHEET 4.
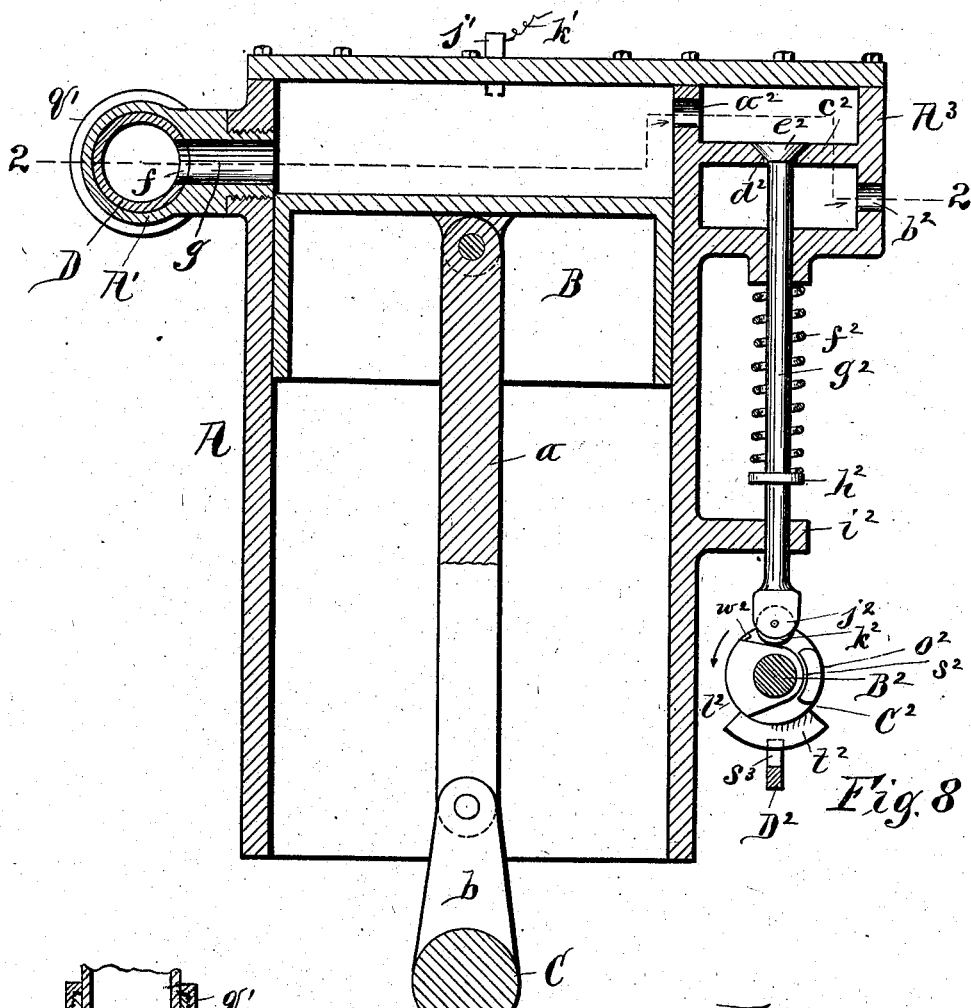
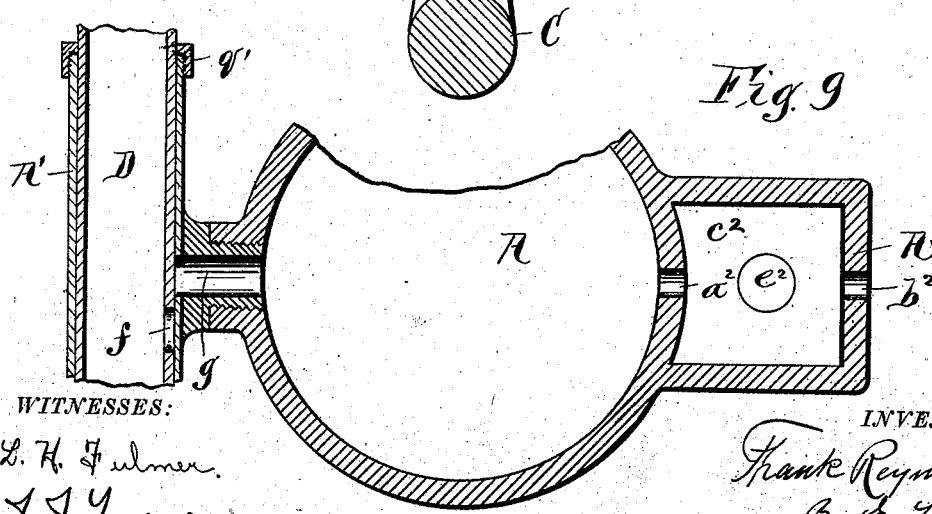

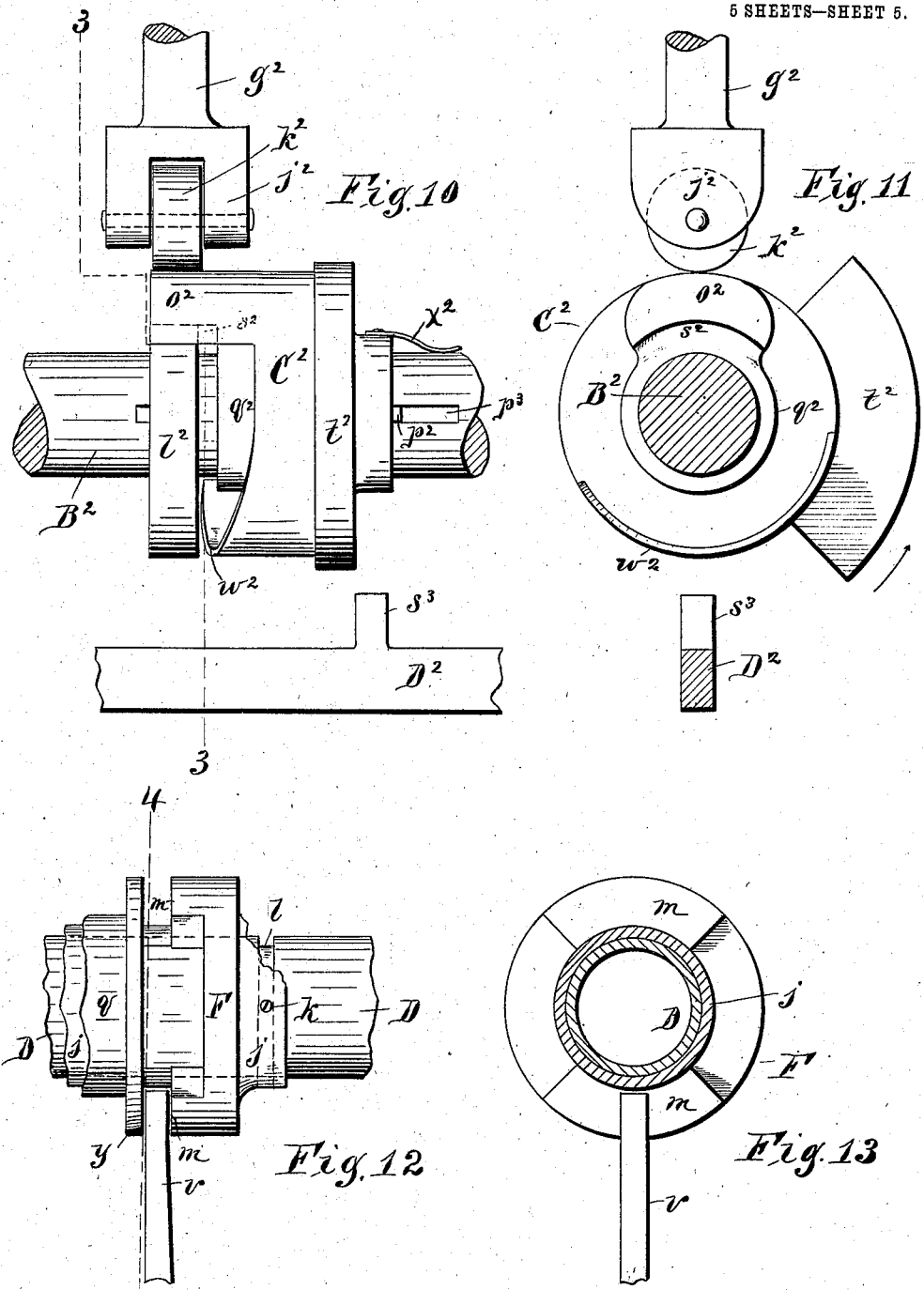

UNITED STATES PATENT OFFICE.

FRANK REYNOLDS, OF SYRACUSE, NEW YORK.

STARTING DEVICE FOR GASOLENE-ENGINES.

No. 899,618.      Specification of Letters Patent.      Patented Sept. 29, 1908.

Application filed February 17, 1904. Serial No. 194,000.

*To all whom it may concern:*

Be it known that I, FRANK REYNOLDS, of Syracuse, in the county of Onondaga, in the State of New York, have invented new and useful Improvements in Starting Devices for Gasolene-Engines, of which the following, taken in connection with the accompanying drawings, is a full, clear, and exact description.

This invention pertains to gasolene-engines and more especially to that class commonly known as the "reciprocating-piston" type, and which are particularly adapted for propelling automobiles and launches, and it resides in means for starting the engines.

The present invention has special relation to and is an improvement on the starting-device shown and described in my prior application for Letters Patent, filed Oct. 16, 1903, Serial No. 177,244, and it is more particularly designed for four-cylinder and two-cylinder engines.

The main object of this invention is to simplify the starting means set forth in the application referred to, and at the same time increase its efficiency.

To that end the invention consists in the novel arrangement and construction of the component parts of the starting-device as hereinafter fully described and set forth in the claims.

In the accompanying drawings Figure 1 is a longitudinal sectional view of a portion of a four-cylinder engine equipped with my improved starting-device, which is shown partly in section. Fig. 2 is an enlarged vertical section on line —X—X— in Fig. 1. Fig. 3 is an enlarged detail view, partly in section, illustrating the stepped-collar which controls the discharge-valves and the means for rotating said collar. Fig. 4 is a vertical transverse section on line —Y—Y— in Fig. 3. Fig. 5 is an enlarged vertical sectional view on line —Z—Z— in Fig. 1. Fig. 6 is a detail longitudinal sectional view of the compressed-mixture tank, showing a modification of the means for effecting the mixture of gasolene and air and for compressing said mixture. Fig. 7 is a side view of a portion of a two-cylinder engine equipped with the starting-device and illustrating the auxiliary means for operating the exhaust-valves subsequent to the initial explosion. Fig. 8 is an enlarged vertical longitudinal section on line —1—1— in Fig. 7. Fig. 9 is a transverse section on line —2—2— in Fig. 8. Fig. 10 is a further enlarged detail view of the auxiliary or primary means for operating the exhaust-valves of the cylinders. Fig. 11 is a transverse sectional view on line —3—3— in Fig. 10. Fig. 12 is an enlarged detail side view of the stepped-collar employed for regulating the discharge-valves of the two-cylinder engine. Fig. 13 is a transverse sectional view on line —4—4— in Fig. 12.

Referring to Figs. 1, 2, 3, 4, 5 and 6 of the said drawings —A—A— represents the vertically disposed explosion-cylinders of a four-cylinder engine, in which are disposed respectively the usual reciprocating pistons —B—B— having their rods —a—a— connected to cranks —b—b— secured to or formed integral with the main shaft —C— in the well known manner.

—D— denotes a pipe which is disposed horizontally and centrally above the cylinders —A—A— and is supported in couplings —A¹—A¹— in which it is adapted to be shifted longitudinally and by which it communicates with the said cylinders. The said pipe is closed at one end by a cap —d— and communicates at its opposite end with a stationary upright pipe —B¹— by means of a similar coupling —A²—, which is closed at one end by a disk or cap —e—. Said latter pipe —B¹— extends from a suitable tank —E— which is employed for containing the explosive-mixture under compression. The said disk —e— may be composed of any suitable material and is intended to be secured to the coupling —A²— in such a manner as to be forced therefrom under an excess pressure of the mixture in the pipe D and thus serve as a safety-valve. The said pipe —B¹— serves to supply the explosive-mixture to the pipe —D—, which latter constitutes a feed-pipe and is provided with discharge-valves —f—f— consisting of ports in the pipe. These ports are disposed, when closed, at uniformly increased distances from the respective vertical passages —g—g— in the couplings —A¹—A¹—, which passages communicate with the interiors of the respective cylinders. By arranging the valves or ports —f—f— as described and as illustrated in Fig. 1, the longitudinal shifting of the pipe —D— causes said ports to successively afford communication between the pipe and respective passages —g—g— and thus admit the explosive-mixture into the corresponding cylinders. The supply of said mixture is controlled by means of an oscillatory valve —$h$— which is normally closed and is operated by means of a hand-lever —$i$—. Said valve may be applied to any suitable and convenient part of the pipe —$B^1$—, and may be operated from a distant point by any suitable means.

—F— denotes a collar which is formed on a sleeve —$j$— rotatably mounted on the aforesaid feed-pipe —D—, through which sleeve passes a pin —$k$— traveling in a circumferential groove —$l$— formed in the pipe. Said collar —F— is formed with four steps —$m$—$m$— of uniformly increased depths corresponding with the gradually increased distances between the ports —$f$—$f$— and respective passages —$g$—$g$—. This collar is preferably rotated by means of a sprocket-wheel —$n$— which is geared 2 to 1 with and receives motion from a sprocket-wheel —$o$—, secured to the engine-shaft —C—, by means of a chain —$p$—. The said sprocket-wheel —$n$— is formed with a hub —$q$— by which it is mounted on the aforesaid sleeve —$j$— of the collar —F—, and through said hub passes a pin —$r$— which engages a longitudinal slot or groove —$s$— formed in the sleeve, whereby the collar is caused to rotate with the said sprocket-wheel. This connection of the sprocket-wheel and sleeve allows the latter to be shifted longitudinally and thereby impart like movement to the pipe —D—, while the wheel remains unmoved.

To prevent the sprocket-wheel from moving out of alinement with the other sprocket-wheel, I provide a suitable guide —$t$— on the adjacent cylinder —A— in which guide travels a flange —$u$— formed on the hub of the said sprocket-wheel as shown in Fig. 3 of the drawings. This sleeve —$j$— is shifted preferably by means of a two-armed lever —G— composed of a vertical arm —$v$— and a horizontal arm —$w$— and pivoted to a suitable bracket —$x$— secured to the adjacent cylinder —A—. The vertical arm —$v$— of said lever is disposed with its free end at the collar —F— and is adapted to engage the steps —$m$—$m$— thereof in its outward movement. The engagement of said arms with one of the steps shifts the pipe —D— in one direction to carry the corresponding port —$f$— into registry with its passage —$g$—. The collar —F— is so adjusted, and regulated in its rotation that, when a piston of a cylinder next to be exploded begins its downward stroke, one of the steps of the collar is presented to the shifting-lever hereinbefore described. In the inward movement of said arm —$v$— of the lever, it engages a flange —$y$— formed on the sleeve —$j$— and thereby moves the collar and pipe to their normal positions to cut off the discharge of mixture admitted through the previously registered port. The said two-armed lever —G— is actuated by the aforesaid hand-lever —$i$— which operates the supply-valve —$h$—. I preferably connect the said lever —G— to the other lever by means of a rod —$a^1$— pivoted at one end in a longitudinal slot —$b^2$— in the end portion of the arm —$w$— and attached at its opposite end by means of a pin —$c^1$— to an eccentrically-slotted arm —$d^1$— rigidly fastened to the stem —$e^1$— of the valve —$h$—. The rod —$a^1$— is provided with a suitable guide —$f^1$— preferably fastened to the pipe —$B^1$—.

—H— represents a carbureter in which the mixture of gasolene and air is produced, and which may be of any suitable construction and is connected to a pump —I—, which pump serves to make and draw the mixture from the carbureter and compress the same in the tank —E— to which the pump is attached as shown. This pump is operated automatically by means of an eccentric —$I^1$— mounted on the shaft —C— or any other rotating part and connected to the piston-rod of the pump, and is provided with a suitable check-valve —$g^1$— as shown in Fig. 1.

—$h^1$—$h^2$— denotes two yielding electric-contacts to which are respectively connected the wires —$i^1$—$i^2$— of a primary electric-circuit (not necessary to be shown).

—$j^1$—$j^1$— represent the usual spark-plugs which are secured in the heads of the cylinder —A—A— in the usual and well known manner, to which plugs are connected the wires —$k^1$—$k^1$— of a secondary electric-circuit, common to all explosion-engines. It will be understood that the secondary electric-circuit is to be provided with the usual vibrators by which the sparking of the plugs is produced (not shown).

The aforesaid yielding contacts —$h^1$—$h^2$— of the primary electric-circuit are insulated apart as indicated at —$l^1$— and may be supported in any suitable and convenient manner. In the present instance they are shown fastened to the top of the tank —E—. These contacts are normally apart to maintain the primary circuit open, and one of said contacts is preferably provided with a pin —$h^3$— adapted to engage the other contact for closing the circuit. —$m^1$— denotes the circuit-maker and -breaker of said primary circuit and consists of an arm rigidly attached at one end to the aforesaid stem —$e^1$— of the valve —$h$— and depends therefrom.

In opening the valve —$h$—, its stem —$e^1$— swings the free end of the arm —$m^1$— in one direction, in which movement the arm passes freely by the contacts, and in closing the valve, the beveled portion —$n^1$— of the arm engages the outer face of the contact —$h^1$— and forces the same against the contact —$h^2$— and thereby closes the circuit. The said contact —$h^1$— is released from the arm when the valve is completely closed, and by this quick making and breaking of the primary electric-circuit, vibrations are produced in secondary electric-circuit which cause a sparking at the plug —$j^1$— in the charged cylinder —A— and the resultant explosion of the mixture in the well known manner.

—$o^1$—$o^1$— are the usual exhaust-valves which are shown by dotted lines and may be applied to any suitable and convenient portion of the cylinders, and —$p^1$—$p^1$— are the usual valves through which the explosive-mixture is admitted into the cylinders from the main carbureter. A detailed description and illustration of said valves and carbureter are unnecessary inasmuch as said parts are employed in all gasolene-engines of this character.

The ends of the couplings —$A^1$—$A^1$— and coupling —$A^2$— are provided with suitable packing-boxes —$q^1$—$q^1$— to form air-tight joints between the said couplings and pipe —D—.

It will be seen by reference to Fig. 6 of the drawings, that in producing the compressed explosive-mixture, the carbureter —H— may be dispensed with, in which case, I deposit a proper amount of gasolene in the tank —E— as indicated at —$r^1$—, and provide the automatic pump —I— with an air-tube —$s^1$— which extends from the top of the tank to within a short distance of the bottom thereof. This tube —$s^1$— is provided at its upper portion with a small hole —$t^1$— which serves as a vent to prevent the gasolene from being forced back through the valve —$g^1$— and escaping by reason of back pressure of the compressed explosive-mixture in case of any imperfection in the valve. When this latter method of producing and compressing the explosive-mixture is employed, I provide the top of the tank —E— with an opening —$u^1$— through which the gasolene is introduced, and apply a removable plug —$v^1$— to the opening.

Having described the construction of my improved starting-device as combined with a four-cylinder engine, I will now proceed to explain the operation of the same: The engine is assumed to be at rest, and therefore to start the engine, the person in charge moves the hand-lever —$i$— rearward, (as viewed in Fig. 1 of the drawings) to open the valve —h— whereby a proper supply of the compressed explosive-mixture is released from the tank —E— through the pipe —$B^1$— and enters the pipe —D—. This operation of the hand-lever simultaneously actuates the eccentrically slotted arm —$d^1$— and thereby imparts an outward movement to the arm —v— of the lever —G—, which in turn engages the step —m— presented to the lever by the rotatable collar —F—. This movement of the arm —v— shifts the pipe —D— longitudinally and causes the port —f—, corresponding with the presented step, to register with the adjacent passage —g— of the coupling —$A^1$—, whereby the mixture is admitted into the corresponding cylinder —A—. The return movement of the hand-lever —$i$— in closing the valve —h—, causes the arm —v— of said lever —G— to engage the flange —y— on the sleeve —$j$— of the collar and thereby shift the collar with the pipe back to their normal positions to cut off the discharge of mixture and entrap the discharged mixture in the cylinder. This latter movement of the handle causes the arm —$m^1$—, attached to the valve-stem —$e^1$—, to force the electric-contact —$h^1$— against the contact —$h^2$— to close the primary electric-circuit and immediately release said contact. This quick make and break of the primary circuit causes a sparking at the plug —$j^1$— in the charged cylinder in the manner described, and thus produces an explosion of the entrapped mixture. The engine now being well under motion, the explosive-mixture is supplied from the usual main carbureter, successively and automatically to the cylinders, and ignited in the well known manner.

In Figs. 7, 8, 9, 10, 11, 12 and 13 of the drawings illustrating my improved starting-device applied to a two-cylinder engine, the various parts are lettered according to like parts shown and described in the aforesaid four-cylinder engine. Fig. 7 is intended to represent a four-cycle engine, therefore the cranks —b—b— are placed in like positions in relation to the shaft —C—. Referring to the said two-cylinder engine, the horizontal discharge-pipe —D— is arranged at the sides of the cylinders —A— and is supported longitudinally shiftable in the couplings —$A^1$—$A^1$— in the manner hereinbefore described, which couplings have their passages —g—g— communicating with the sides of the cylinders as more clearly shown in Fig. 8. In this case, the collar —F— which is employed for shifting the said pipe, is provided with two steps —m—m— which operate in the manner aforesaid. These cylinders —A—A— are each formed on the side opposite the coupling —$A^1$— with an exhaust-chamber —$A^3$— provided with an inlet-port —$a^2$— communicating with the upper portion of the cylinder, and with an outlet-port —$b^2$— as clearly shown in Fig. 8. This chamber —A— is provided with a horizontal partition —$c^2$— disposed between the ports —$a^2$— —$b^2$—, in which is formed a port —$d^2$— provided with a valve —$e^2$— which is held normally closed by means of a spiral spring —$f^2$— surrounding the downwardly extending stem —$g^2$— of the valve and disposed between the underside of the chamber and a collar —$h^2$— attached to said stem. Each valve-stem —$g^2$— is provided with a suitable guide —$i^2$— attached to the side of the cylinder —A—, and the lower end of the stem is formed with a bifurcation —$j^2$— in which is pivoted a roller —$k^2$— adapted to be engaged by a cam —$l^2$— fastened to a horizontal shaft —$B^2$— which receive its rotary motion from the engine-shaft by means of gears —$m^2$—$m^2$—. These gears are of such relative sizes as to impart one revolution to the shaft —$B^2$— during two revolutions of the engine-shaft. The aforesaid cams —$l^2$—$l^2$— are so arranged upon the shaft —$B^2$— as to cause the exhaust-valves —$e^2$—$e^2$— of the respective cylinders to be alternately opened.

The described cam-mechanism constitutes the main exhaust-controlling device which is well known and operates regularly when the engine is under motion.

In using my improved starting-device in connection with the two-cylinder engine, any suitable main exhaust-devices may be employed, however, I prefer to use the means shown and described and combine therewith auxiliary means operative to effect the initial exhaust incident to the starting of the engine. This auxiliary means comprises two collars —$C^2$—$C^2$— mounted longitudinally shiftable on the aforesaid rotary shaft —$B^2$— and disposed adjacent to the respective cams —$l^2$—$l^2$—, each of which collars is formed with a cam —$o^2$— adapted to engage the roller —$k^2$— carried on the lower end of the stem —$g^2$— of the exhaust-valve —$e^2$— to open the latter. The said collars —$C^2$—$C^2$— are caused to rotate with the shaft —$B^2$— and each is permitted to be shifted thereon by means of a spline —$p^2$— fastened to the hub —$q^2$— of the collar and disposed in a longitudinal groove —$p^3$— provided in the shaft. Between the cam —$o^2$— and hub —$q^2$— of the collar is formed a recess —$s^2$— as clearly shown in Fig. 11. This recess serves to accommodate the hub of the cam —$l^2$— when the cam —$o^2$— is moved into its operative position as shown in Fig. 8. These collars —$C^2$—$C^2$— are shifted by means of a longitudinally movable horizontal bar —$D^2$— disposed below the same and provided with two upwardly projecting lugs —$s^3$—$s^3$— arranged to engage segmental plates —$t^2$—$t^2$— rigidly attached to or formed integral with the respective collars, as clearly shown in Figs. 7, 10 and 11 of the drawings, which bar is preferably supported in guides —$u^2$—$u^2$— on the cylinders —A—A—. The bar —$D^2$— is pivotally connected at one end to a downwardly extending arm —$v^2$— rigidly attached to the pivoted portion of the two-armed lever —G— which is actuated by the aforesaid hand-lever —$i$— for operating the valve —$h$—. The said cams —$o^2$—$o^2$— project from opposite sides of the shaft —$B^2$— in relation to the respective main cams —$l^2$—$l^2$—, and each is adapted to be moved into operative position when the roller —$k^2$— is out of contact with the adjacent cam —$l^2$—. Each of the said collars —$C^2$— is formed with a peripheral segmental cam-shaped flange —$w^2$— which, during the rotation of the collar, incident to the initial explosion, engages the bifurcated portion of the valve-stem —$g^2$— when the latter is released from the cam —$o^2$—, and shifts the collar back to its normal position automatically. To prevent accidental shifting of the collar —$C^2$— toward the valve-stem during the running of the engine, I provide the collar with a friction-spring —$x^2$— which bears upon the shaft —$B^2$— as shown in Fig. 10 of the drawings.

The operation of the described auxiliary exhaust-controlling mechanism employed in my starting-device in its latter application will now be fully explained. By operating the hand-lever —$i$—, to open the valve —$h$— for supplying the explosive-mixture, the two-stepped collar —F— is actuated by the two-arm lever —G— to shift the pipe —D—, whereby the explosive-mixture is admitted into proper cylinder, which is governed by the step —$m$— presented to the upright arm of the latter lever as hereinbefore described. This movement of the lever —G— imparts longitudinal movement to the bar —$D^2$— in the direction indicated by the arrow in Fig. 7 of the drawings, whereby one or the other of the lugs —$s^3$— on the bar may engage its adjacent segmental plate —$t^2$— projecting from the collar —$C^2$—, in case the plate is in the path of the lug when the engine is at rest. Said engagement of the lug with the plate shifts the collar —$C^2$— and carries its cam —$o^2$— over the hub of the main cam —$l^2$—. Then by turning the hand-lever —$i$— to its normal position to close the supply-valve —$h$—, the pipe —D— is shifted to its normal position, whereby the proper amount of mixture is entrapped in the cylinder in the manner aforesaid and ignited through the action of the circuit maker and breaker operated by said lever as heretofore explained. This movement of the hand-lever —$i$— causes the lever —G— to retract the bar —$D^2$— which allows the cam —$o^2$— to remain in its operative position. The ignition of the entrapped mixture forces down the piston of the cylinder in the well known manner, whereby the shaft —C— is rotated and imparts like movement to the shaft —$B^2$—. The rotation of the latter shaft causes the cam —$o^2$— to engage the roller —$k^2$— and lift the stem of the valve —$e^2$— to open the valve for a brief period and thereby allows the exhaust to escape from the chamber —$A^3$— through the port —$b^2$—. When the valve-stem is released from the cam —$o^2$—, the same is forced downward by the aforesaid spiral spring —$f^2$— to automatically close the valve, and thus the roller —$k^2$— on the stem is brought in position to be subsequently engaged by the main cam —l²— which operates regularly when the engine is under motion. The rotation of the shaft— B²— causes the peripheral cam-shaped flange —w²— of the collar —C²— to engage the bifurcated portion of the stem and thereby shift the collar to its normal position. After the collar is thus shifted, the main cams —l²— automatically and alternately open the exhaust-valves in the well known manner.

When it is desired to start the engine, and the collars —C²—C²— are in such positions that neither of the plates —t²—t²— is engaged by its lug —s³— when the hand-lever —i— is operated, the initial exhaust will be effected by the engagement of the main cam with the valve-stem —q²—.

It will be understood that the carbureter —H— may also be dispensed with when the starting-device is used in connection with the two-cylinder engine, and the means for forming and compressing the explosive-mixture illustrated in Fig. 6 of the drawings may be employed.

My described starting-device may be employed in connection with an explosive-engine composed of any number of cylinders, and the usual valves may be utilized to effect the exhaust, incident to the initial explosions, and furthermore, these valves may be operated automatically by any well known means. For this reason I have omitted the valve-operating means in the four-cylinder engine illustrated in Fig. 1 of the drawings. This means may consist of the cams —l²—l²— operating the valve-stems —q²—q²— as shown in Fig. 7 of the drawings, and which are common to various engines of this type. However, I do not limit myself in this respect, as it has been found, in some instances, that additional devices are desirable for operating the said exhaust-valves in connection with the starting-device, and which may be controlled by the person in charge of the engine. These additional or auxiliary devices in the present case comprise the cams —o²—o²— which are shifted into position to actuate the stems of the valves for opening the latter, by the manually operated means hereinbefore described.

It will be understood that the described cam-mechanism employed in connection with the two-cylinder engine and shown in Figs. 7 and 8 of the drawings, is to be applied to the four-cylinder engine shown in Fig. 1, in identically the same manner.

What I claim is:—

1. In a gasolene-engine, the combination with the explosion-cylinder, electric spark-plug therein, and exhaust-means, of a starting-device comprising a tank for storing explosive-mixture under compression, a passage leading from the tank to said cylinder, a valve controlling the supply of compressed-mixture to the passage, a valve controlling the admission of mixture from the passage into the cylinder, electric contacts, an electric circuit-maker and breaker adjacent to said contacts, and a manually operated means for actuating said valves and circuit-maker and breaker.

2. In a gasolene-engine, the combination with the explosion-cylinder, electric spark-plug therein, and exhaust-means, of a starting-device comprising a tank for storing explosive-mixture under compression, a carbureter independent of the engine, an automatically operated pump drawing the mixture from the carbureter and compressing the same into the said tank, a passage leading from the tank to the cylinder, a valve controlling the supply of compressed-mixture from the tank to the passage, a valve controlling the admission of the mixture from the passage into the cylinder, a pair of normally open electric-contacts, a circuit-maker and breaker adjacent to said contacts, and a manually operated lever simultaneously actuating said valve and circuit-maker and breaker, as set forth.

3. In a gasolene-engine, the combination with the explosion-cylinder, electric-igniter, and exhaust-means, of a starting-device comprising a tank for storing explosive-mixture under compression, a pipe communicating with the tank and cylinder, a valve controlling the supply of mixture from said tank to the pipe, an admission-port in the pipe at the cylinder, an electric-circuit-maker and breaker controlling the igniter, a manually operated lever for actuating the circuit-maker and breaker and supply-valve, and means actuated by said lever for opening and closing said port as set forth.

4. In a gasolene-engine, the combination with the explosion-cylinder, electric-igniter, and exhaust-means, of a starting-device comprising a tank for storing explosive-mixture under compression, a stationary pipe extending from said tank, a movable pipe leading from the stationary pipe to the cylinder and provided with an admission-port affording communication with said cylinder, a valve in the stationary pipe controlling the supply of compressed-mixture from the tank, a manually operated lever for actuating said valve, mechanism actuated by the lever for operating the movable pipe to open and close the port thereof, and an electric-circuit-maker and breaker actuated by said lever for the purpose set forth.

5. In a gasolene-engine, the combination with a plurality of cylinders, their reciprocating pistons, suitable igniters in said cylinders, and exhaust-means therefor, of a starting-device comprising a tank for storing the explosive-mixture under compression, a longitudinally shiftable pipe disposed adjacent to the cylinders and communicating with said tank, means controlling the supply of mixture to said pipe, discharge-ports in said pipe and arranged to successively afford communication between the pipe and respective cylinders and regulated by the movement of the pipe, means for shifting said pipe, and means controlling the aforesaid igniters as set forth.

6. In a gasolene-engine, the combination with a plurality of cylinders, reciprocating pistons therein, suitably controlled igniters in said cylinders, and exhaust-means therefor, of a starting-device comprising a tank for storing the explosive-mixture under compression, a longitudinally shiftable pipe disposed adjacent to the cylinders and communicating with said tank, a valve controlling the supply of mixture to said pipe, a hand-lever for operating said valve and simultaneously shifting said pipe, and discharge-ports in said pipe and arranged to afford communication between the pipe and respective cylinders and controlled by the movement of the pipe as set forth.

7. In a gasolene-engine, the combination with a plurality of cylinders having reciprocating pistons and provided with suitable igniters and exhaust-means, of a starting-device comprising a tank for storing the explosive-mixture, automatic means for compressing the mixture, a longitudinally shiftable pipe disposed adjacent to the cylinders and communicating with said tank, a normally closed valve controlling the supply of explosive-mixture to said pipe, a hand-lever for operating said valve, discharge-valves arranged to successively afford communication between the pipe and respective cylinders and controlled by the movement of the pipe, means actuated by said lever for shifting the pipe, and means actuated by said lever for controlling the aforesaid igniters as set forth.

8. In a gasolene-engine, the combination with a plurality of cylinders, reciprocating pistons therein, suitably controlled igniters in the cylinders, and exhaust-means, of a starting-device comprising a tank for storing the explosive-mixture under compression, couplings attached to the respective cylinders and provided with passages leading into the same, a pipe supported longitudinally shiftable in said couplings and communicating with said tank and provided with discharge-ports arranged to communicate with the respective passages, a normally closed valve controlling the supply of explosive-mixture to said pipe, and means for simultaneously operating said valve and shifting said pipe as set forth.

9. In a gasolene-engine, the combination with a plurality of cylinders, reciprocating pistons therein, electric spark-plugs in said cylinders, and exhaust-valves therefor, of a starting-device comprising a tank for storing the explosive-mixture under compression, automatic means for compressing said mixture, couplings attached to the respective cylinders and provided with passages leading into the same, a pipe supported longitudinally shiftable in said couplings and provided with discharge-ports arranged to successively afford communication between the pipe and respective passages, a normally closed valve controlling the supply of explosive-mixture to said pipe, a hand-lever for operating said valve and simultaneously shifting said pipe, and an electric circuit maker and breaker actuated by said lever and controlling the aforesaid spark-plugs as set forth.

10. In a gasolene-engine, the combination with a plurality of vertically disposed cylinders, their reciprocating pistons, igniters in the cylinders, and exhaust-valves, of a starting-device comprising a tank for storing the explosive-mixture, a suitably operated pump for compressing the mixture in said tank, a horizontally disposed pipe adjacent to the cylinders and adapted to be shifted longitudinally, discharge-ports in said pipe arranged to successively afford communication between said pipe and respective cylinders and controlled by the shifting of the pipe, a supply-pipe leading from said tank to the shiftable pipe, a normally closed valve attached to the supply-pipe, a hand-lever for operating said valve, a suitably pivoted two-armed lever operative for moving said shiftable pipe, and means imparting movement from the hand-lever to said two-armed lever as set forth.

11. In a gasolene-engine, the combination with a plurality of vertically disposed cylinders, their reciprocating pistons, igniters in the cylinders, and exhaust-valves, of a starting-device comprising a tank for storing the explosive-mixture under compression, a longitudinally shiftable pipe supported adjacent to the cylinders and communicating with said tank, and provided with discharge-ports arranged to successively afford communication between the pipe and respective cylinders, a normally closed valve controlling the supply of mixture from the tank, a stepped-collar mounted revolubly on said pipe, means engaging said collar for shifting the same longitudinally, means imparting like movement from the collar to the pipe, and a hand-lever for simultaneously operating said supply-valve and pipe-shifting means as set forth.

12. In a gasolene-engine, the combination with a plurality of cylinders, their reciprocating pistons, crank-shaft connected to said pistons, suitably controlled igniters in the cylinders, and exhaust-valves therefor, of a starting-device comprising a tank for storing the explosive-mixture under compression, a supply-pipe leading from the tank and provided with a normally closed valve, a hand-lever for operating said valve, a longitudinally shiftable horizontal pipe communicating with the supply-pipe and supported adjacent to said cylinders, discharge-ports in the shiftable pipe and arranged to successively afford communication between the pipe and respective cylinders, a longitudinally shiftable collar formed with steps and mounted revolubly on the latter pipe and provided with means for moving the pipe with it, means for imparting rotary motion from the engine-shaft to said collar, a lever adapted to engage the steps of said collar to shift the pipe and thereby control the discharge of mixture therefrom, and means imparting movement from the aforesaid hand-lever to the shifting-lever as set forth.

13. In a gasolene-engine, the combination with a plurality of explosion-cylinders provided with reciprocating-pistons, suitably controlled igniters in the cylinders, an exhaust-valve for each cylinder, and automatic mechanism alternately opening said valves, of a starting-device comprising a tank for storing the explosive-mixture under compression, a pipe disposed adjacent to said cylinders and communicating with said tank, a normally closed valve controlling the supply of mixture to said pipe, means for operating said valve, discharge-valves affording communication between said pipe and respective cylinders and operative one at a time, means controlling said discharge-valves, and manually controlled auxiliary mechanism adapted to open the exhaust-valves as and for the purpose set forth.

14. In a gasolene-engine, the combination with a plurality of explosion-cylinders, their reciprocating pistons, suitably controlled igniters in the cylinders, an exhaust-valve for each cylinder, means for maintaining said valves normally closed, and automatic cam-mechanism alternately opening said valves, of a starting-device comprising a tank for storing the explosive-mixture under compression, a pipe disposed adjacent to said cylinders and communicating with the tank, a valve controlling the supply of mixture to said pipe, a hand-lever for operating said supply-valve, discharge-valves arranged to afford communication between the pipe and respective cylinders, one at a time, means operated by said hand-lever for controlling said discharge-valves, auxiliary cam-mechanism for opening the exhaust-valves, one at a time, and movable into operative position by said lever to effect the initial exhaust, and means automatically moving said auxiliary cam-mechanism out of operative position as set forth.

15. The combination with a gasolene-engine comprising a plurality of explosion-cylinders provided with reciprocating pistons, suitably controlled igniters in said cylinders, an exhaust-valve for each cylinder, means automatically closing said valves, and cam-mechanism automatically and alternately opening said valves, of a starting-device comprising a tank for storing the explosive-mixture under compression, a longitudinally shiftable pipe disposed adjacent to the cylinders and communicating with said tank and provided with discharge-ports arranged to afford communication between the pipe and respective cylinders, one at a time, and controlled by the shifting of the pipe, a normally closed valve controlling the supply of mixture from the tank to the said pipe, manually operated means for simultaneously actuating the supply-valve and shifting said pipe, auxiliary cam-mechanism for opening the exhaust-valves, one at a time, and moved into operative position by the aforesaid supply-valve controlling means to effect the initial exhaust, and means for automatically moving said auxiliary cam-mechanism out of operative position as set forth.

16. In a gasolene-engine, the combination with a plurality of explosion-cylinders, reciprocating pistons therein, crank-shaft connected to said pistons, suitably controlled igniters in said cylinders, an exhaust-valve for each cylinder, provided with a stem extending at the exterior of the cylinder, springs maintaining the valves normally closed, a supplemental shaft disposed parallel to and driven by the engine-shaft, main cams secured to said supplemental shaft and arranged to automatically and alternately engage the respective valve-stems, of a starting-device comprising a tank for storing the explosive-mixture under compression, a valve controlling the supply of mixture from the tank, a hand-lever for operating said supply-valve, a longitudinally shiftable pipe supported adjacent to the cylinders and communicating with said tank and provided with discharge-ports arranged to afford communication between the pipe and respective cylinders, one at a time, said ports being controlled by the shifting of the pipe, a two-armed lever operable for imparting movement to the pipe and actuated by the aforesaid hand-lever, auxiliary cams mounted longitudinally movable on the said supplemental shaft and adapted to engage the respective stems of the exhaust-valves, one at a time, a longitudinally shifting rod for moving the latter cams into operative position and actuated by the said two-armed lever, and means attached to the said auxiliary cams for engaging the valve-stems during the rotation of the supplemental shaft to automatically move the said cams out of operative position as set forth.

17. In a gasolene-engine comprising a plurality of explosion-cylinders, reciprocating pistons therein, an igniter and an exhaust-valve for each cylinder, and automatic means alternately operating said valves, the combination therewith, of a starting-device comprising a tank for storing the explosive-mixture under compression, a pipe supported adjacent to said cylinders and communicating with said tank, a valve controlling the supply of mixture to said pipe, a manually operated device for operating said supply-valve, discharge-valves affording communication between the pipe and respective cylinders and operative one at a time, means actuated by the manually operated device for controlling said discharge-valves, an electric-circuit maker and breaker actuated by said device and controlling the igniters, and auxiliary means for operating the aforesaid exhaust-valves and controlled by the said device as set forth.

18. In an explosive-engine, the combination with a plurality of cylinders, their pistons, and suitably controlled igniters and exhaust-means, of a starting-device comprising a reservoir for storing explosive-mixture under compression, a movable pipe connected with the reservoir and provided with normally closed ports arranged to communicate with the respective cylinders, a suitably supported stepped member, and means adapted to engage said stepped member for moving said pipe and thereby automatically determine a port or ports to be opened for admitting the compressed mixture into a cylinder or cylinders as set forth.

19. In an explosive-engine, the combination with a plurality of cylinders, their pistons, and suitably controlled igniters and exhaust-means, of a starting-device comprising a reservoir for storing explosive-mixture, means for automatically compressing the mixture therein, a movable pipe connected with the reservoir and provided with normally closed ports arranged to communicate with the respective cylinders, a suitably supported revoluble stepped collar, and means adapted to engage said collar to move the pipe and thereby automatically determine a port or ports to be opened for admitting the compressed mixture into a cylinder or cylinders as set forth.

20. In a gasolene-engine, the combination with a plurality of cylinders, pistons therein, and their igniters and exhaust means, of a starting-device comprising a tank for storing explosive-mixture under compression, a movable pipe disposed adjacent to the cylinders and connected to the aforesaid tank and provided with ports arranged to admit the mixture into the respective cylinders, said ports being opened and closed by the movement of the pipe, manually operated means for moving said pipe, and means for operating the aforesaid igniters as set forth.

21. In an explosive-engine, the combination with the cylinder, its piston, igniter, exhaust valve, and cam operating said valve, of a starting-device comprising a reservoir for storing explosive-mixture under compression and connected to the cylinder, a valve operative for admitting the mixture into the cylinder, manually operated means for actuating the aforesaid igniter to effect the initial explosion in the cylinder, a supplemental cam operative for opening the exhaust-valve following the initial explosion, means for moving the latter cam into operative position, and automatic means for throwing said supplemental cam out of operative position following the initial exhaust as set forth.

22. In an explosive-engine, the combination with a plurality of cylinders, pistons therein, igniters and exhaust means, of a starting-device comprising a tank for storing explosive-mixture under compression, a passage leading from said tank to the cylinders, valves in said passage, one adjacent to each cylinder, for admitting the explosive-mixture into the cylinders, automatic means for determining the cylinder or cylinders adapted to receive the explosive-mixture, and a manually-operated mechanism for opening and closing the valve or valves of said predetermined cylinder or cylinders as set forth.

FRANK REYNOLDS.

Witnesses:
J. J. LAASS,
G. VAN VORST.